G. N. Munger,
Engravers Vise.
No. 82,627. Patented Sep. 29, 1868.
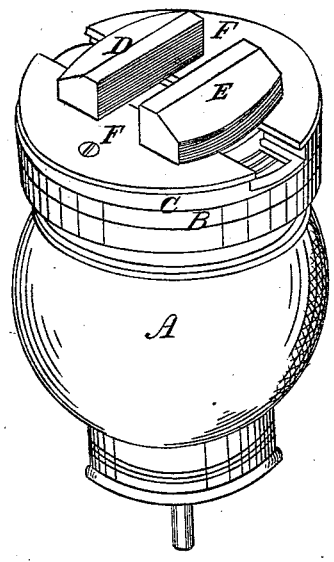
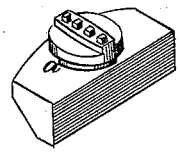
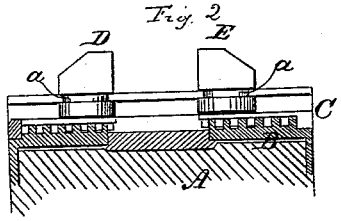
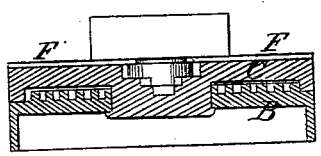
Witnesses
J. H. Shumway
A. J. Tibbits
Geo. N. Munger
Inventor
By his Attorney
John E. Earle

United States Patent Office.

GEORGE N. MUNGER, OF NEW HAVEN, CONNECTICUT, ASSIGNOR TO HIMSELF AND STILLMAN MOORE, OF SAME PLACE.

Letters Patent No. 82,627, dated September 29, 1868.

ENGRAVERS' VISE.

The Schedule referred to in these Letters Patent and making part of the same.

TO ALL WHOM IT MAY CONCERN:

Be it known that I, GEORGE N. MUNGER, of New Haven, in the county of New Haven, and State of Connecticut, have invented a new Improvement in Engravers' Vise; and I do hereby declare the following, when taken in connection with the accompanying drawings, and the letters of reference marked thereon, to be a full, clear, and exact description of the same, and which said drawings constitute part of this specification, and represent, in—

Figure 1, a perspective view,
Figure 2 a vertical section across the two jaws,
Figure 3 a transverse section between the jaws, and in
Figure 4 a perspective view of one of the jaws inverted.

This invention relates to an improvement in the instrument used by engravers for holding small articles, as spoons, forks, &c., for engraving, the object being to construct a vise easily adjustable, simple in its operation, and cheap in its construction; and consists in the arrangement, upon the head of the block, of a plate, in the surface of which is cut a spiral thread, and over the said plate is arranged another divided plate, the division between the two parts forming a guide for the two jaws, the said two jaws extending down into the thread on the lower plate, and so that, by the revolving of the upper plate and jaws, the jaws will traverse to or from each other, according to the direction in which the plate is turned.

To enable others to construct my improvement, I will fully describe the same, as illustrated in the accompanying drawings.

A is a block, such as is used by engravers, upon the upper end of which I fix a plate, B, (see figs. 2 and 3,) upon the upper surface of which plate is formed a spiral thread, and above the said plate B, and pivoted through the centre thereto, I arrange another plate, C, so as to turn freely around upon the plate B, the said upper plate being divided, or having a groove through the centre, as seen in figs. 1 and 3, into which said grooves are set two jaws, D and E, (seen in figs. 1 and 2,) the said jaws being provided upon their under side with points or studs, which set into the grooves in the lower plate, one of the said jaws each side of the centre, as seen in figs. 1 and 2.

The shank of the said jaws which extends into the groove on the plate C, has formed thereon an annular groove, a, into which, on the plate C, another plate, F, upon each side, is fixed, so as to set into the said annular groove, and prevent the removal of the jaws from the plate.

The said jaws are formed so that they may freely turn to an angle to each other; therefore, by turning the plate C, which also turns the jaws, the jaws are drawn toward or from each other, according to the direction in which the plate is turned, and being free, so as to incline to each other, the two jaws will conform themselves to the article to be grasped. Thus, by turning the plate in the direction for the jaws to approach each other, the article to be wrought will be firmly grasped, and so held till released by reversing the plate C.

Having thus fully described my invention, what I claim as new and useful, and desire to secure by Letters Patent, is—

The engravers' vise herein described, consisting of the two jaws D and E, arranged upon the threaded plate B, and in the plate C, so as to be adjusted to grasp the article of regular or irregular form, substantially as herein set forth.

GEO. N. MUNGER.

Witnesses:
J. H. SHUMWAY,
A. J. TIBBITS.